July 22, 1969
D. E. BAKER
3,456,599
PRODUCTION OF DOUGH
Filed Aug. 5, 1966
3 Sheets-Sheet 1
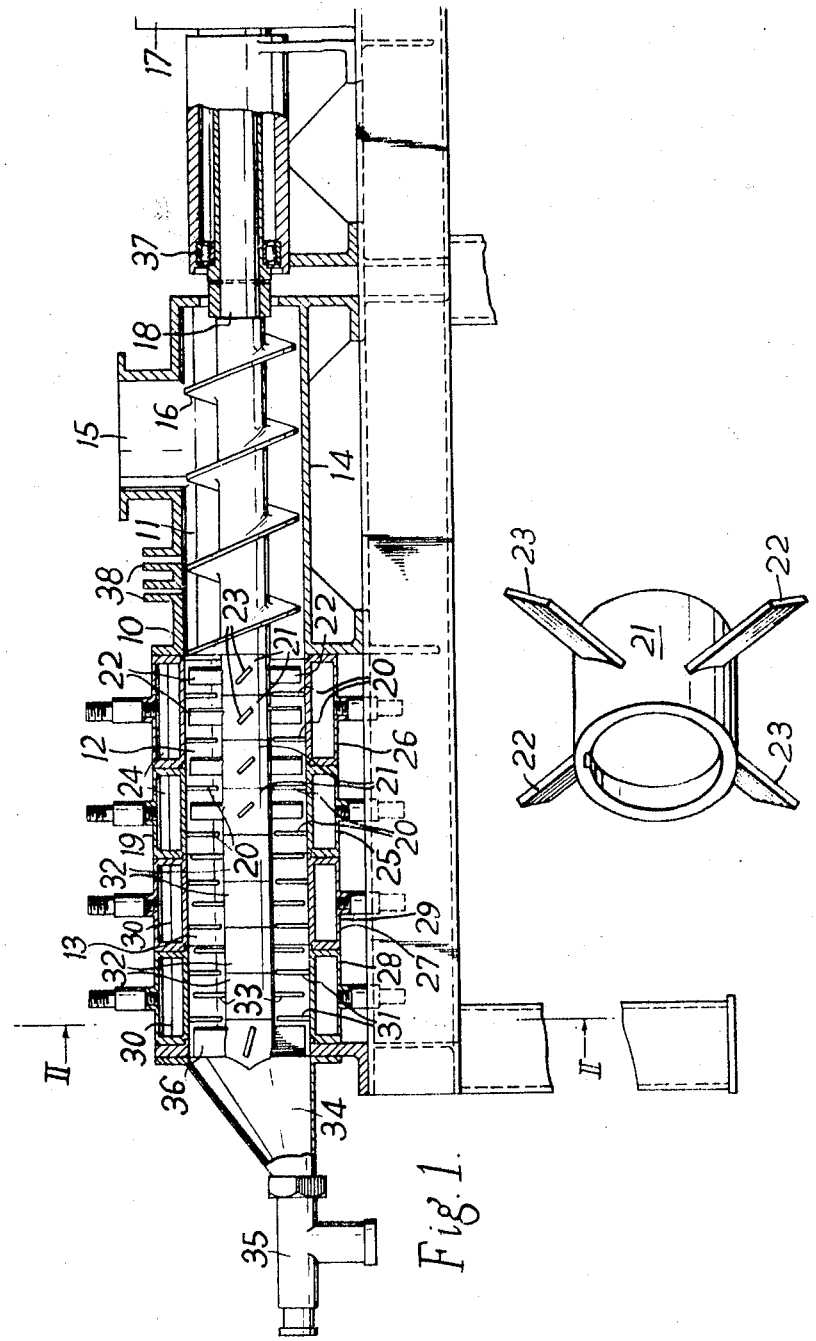
INVENTOR
DONALD E. BAKER
BY
HIS ATTORNEYS July 22, 1969  D. E. BAKER  3,456,599
PRODUCTION OF DOUGH
Filed Aug. 5, 1966  3 Sheets-Sheet 2
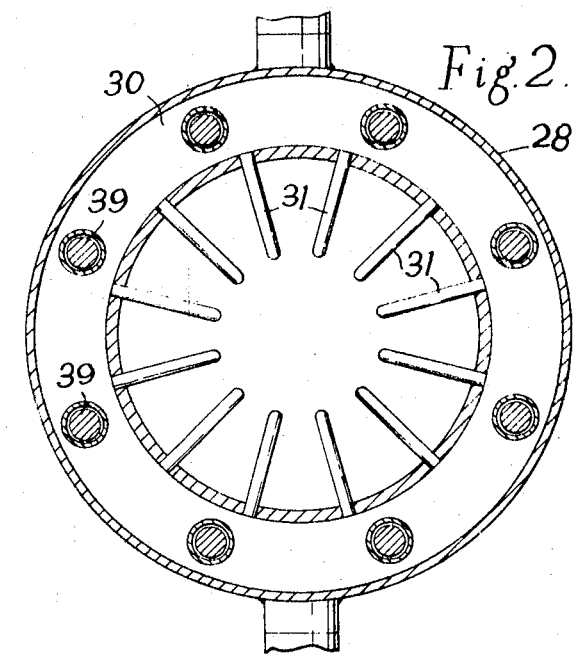
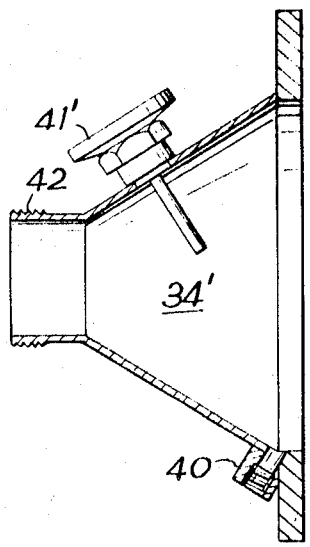
INVENTOR
DONALD E. BAKER
BY
HIS ATTORNEYS United States Patent Office 3,456,599
Patented July 22, 1969

3,456,599
PRODUCTION OF DOUGH
Donald Ernest Baker, Bollington, Macclesfield, England, assignor to The E. T. Oakes Corporation, Islip, N.Y., a company of New York
Continuation-in-part of application Ser. No. 394,719, Sept. 8, 1964. This application Aug. 5, 1966, Ser. No. 570,605
Claims priority, application Great Britain, Sept. 25, 1963, 37,805/63
Int. Cl. A21c *1/06, 1/14;* B01f *15/06*
U.S. Cl. 107—30                                25 Claims

ABSTRACT OF THE DISCLOSURE

An apparatus for the continuous production of dough is provided with a series of interconnected chambers, including in sequence a feeding chamber, a mixing chamber and a developing chamber. A rotary screw extends through the series of chambers and carriers a feed screw, mixing rotors and developing rotors within the respective chambers. Stator elements which interdigitate with the mixing and developing rotors are mounted on the inner walls of the mixing and developing chambers. Dough ingredients are introduced into the feeding chamber and thereafter advance through the mixing and developing chambers to produce the finished dough. The mixing and developing treatment of the dough is controlled so that the amount of energy imparted to the dough is between 0.2 and 0.65 horsepower-minutes per pound and the rate of imparting this amount of energy is between 0.04 and 0.60 horsepower-minutes per pound per minute.

---

Figure 5:
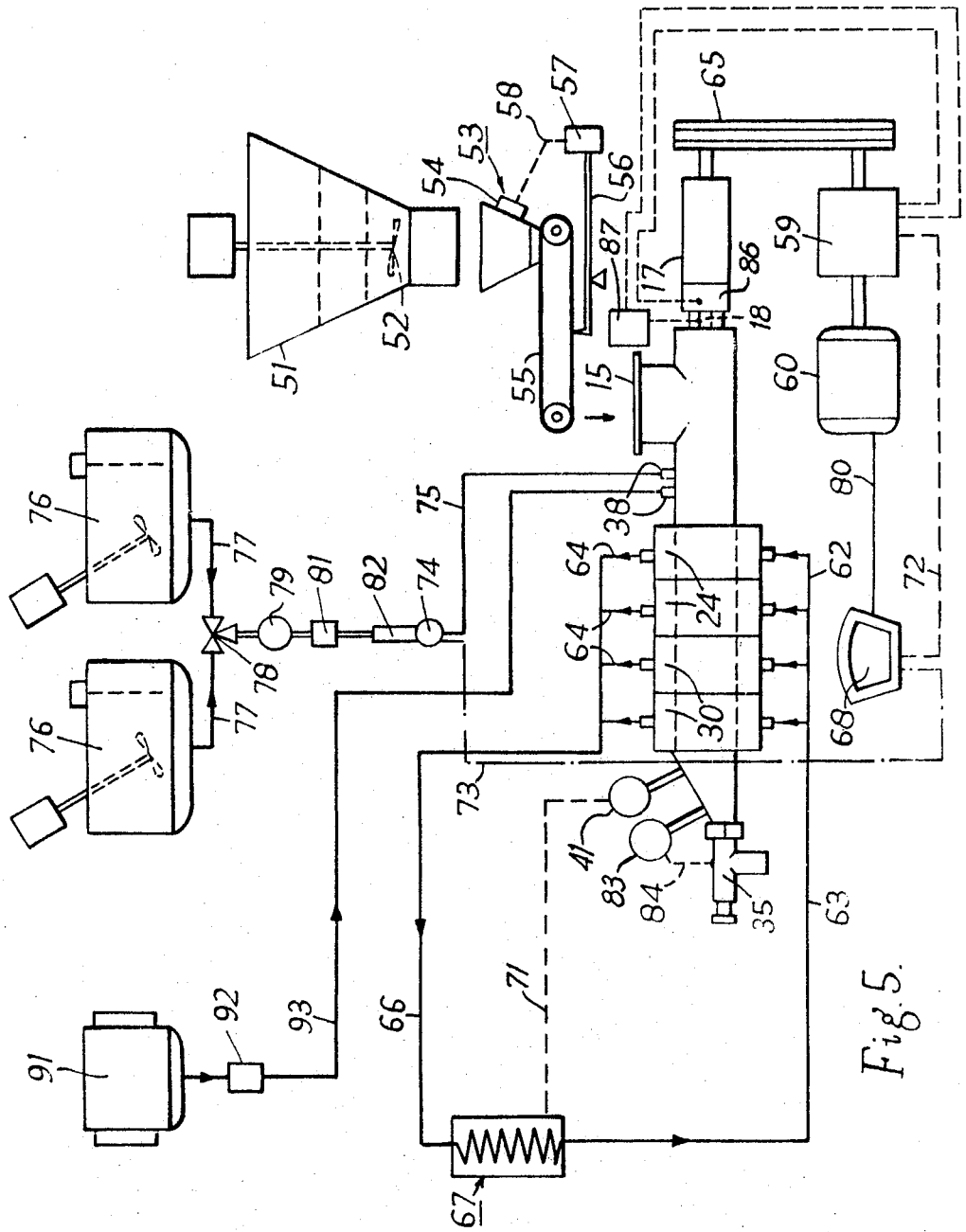

This is a continuation-in-part of application Ser. No. 394,719, filed Sept. 8, 1964 and now abandoned.

The present invention relates to the continuous production of dough and like materials.

The invention is primarily concerned with the modifying of bread dough, to obtain the required gas-retention properties, during the continuous production of bread either by a conventional fermentation process or by a process in which the dough is aerated by gas injection, for example as described in British patent specification No. 867,428. Such processes for the continuous production of bread include the step of subjecting the dough to a beating and kneading action. The object of the beating and kneading step, known as modifying or developing, is to change the rheological properties of the bread dough so that it is in a form suitable for the retention of gas.

The invention is, however, also concerned with the development of biscuit and pastry doughs during the continuous production of biscuits and pastry respectively. Again, certain necessary changes in the rheological properties of such doughs are produced by beating and kneading, though the nature of these changes is of course different from that of the changes produced in the case of bread dough.

During the modifying of the dough by mechanical means, energy is imparted to the dough, and it has been found that the way in which the properties of the dough are modified during the beating and kneading depends on the amount of energy expended. For example, the British Baking Industries Research Association has established that there is an optimum amount of energy which should be expended in the developement of bread dough, and that this optimum can be expressed as 0.4 H.P. min. per lb. This means that the energy which would be expended on each pound of dough is equal to 13,200 foot pounds.

In one aspect, the present invention is based on the realisation that, not only is it important to expend a predetermined amount of energy on each pound of dough, but, in addition, it is important to expend this energy in a predetermined interval of time. That is to say that, not only is there an optimum amount of energy per pound to be imparted but that there is an optimum rate at which it should be imparted. An example of an optimum value of this rate is 7,600 foot pounds per pound weight per minute in the case of one type of dough. Thus in this case, 13,200 ft. lbs. of energy must be imparted to each pound of dough at the rate of 7,600 ft. lbs. per min. This is equivalent to expending an amount of energy equal to 13,200 ft. lbs. on each pound of dough, but imparting that energy during approximately 1.7 minutes.

In practice it has been found that, in the case of bread dough, the optimum energy per lb. is about 0.4 H.P. min. (or 13,200 ft. lbs.) irrespective of the type of bread dough, but that the optimum time for imparting it may vary between 1.1 and 5 minutes for different bread doughs. For other types of dough, for example some biscuit doughs, the optimum energy input may be between 0.2 and 0.65 H.P. min. per lb.

There is provided in accordance with the present invention a method of producing dough including the steps of kneading the dough mechanically in apparatus for the continuous production of dough, and controlling both the amount of energy imparted to each unit mass of dough whilst in the apparatus, and the rate at which this energy is imparted to each unit mass of dough, in such a manner as to maintain these two factors simultaneously equal or approximately equal to predetermined, optimum values.

Preferably the said predetermined optimum value of the amount of energy imparted to each unit mass of dough lies between 0.2 and 0.65, e.g. between 0.35 and 0.45 horsepower minutes per lb. weight, and the said predetermined optimum value of the rate at which energy is imparted to the dough lies between 0.04 and 0.60, e.g. between 0.07 and 0.41 horsepower minutes per lb. weight per minute.

At a given throughput rate of dough, the energy imparted to each unit mass of dough may be varied, wholly or in part, by varying the speed of rotation of one or more rotatable kneading elements contained in the apparatus. The rate at which the energy is imparted may be controlled by controlling the length of time during which it remains in the apparatus.

The present invention is also concerned to provide apparatus for modifying dough, which can be adjusted to impart the optimum energy per unit mass of dough at the optimum rate, and has sufficient range of adjustment to allow for variations in the throughput of dough through the machine, and for variations in optimum conditions depending upon the flour quality, recipes and the like.

There is provided in accordance with the invention apparatus for use in the continuous production of dough, including a modifying chamber housing one or more rotatable elements for kneading dough, means for feeding dough through the modifying chamber, means for controlling the speed of rotation of the kneading elements, and means for controlling the length of time during which each unit mass of dough remains in the modifying chamber.

The means for controlling the length of time during which each unit mass of dough remains in the modifying chamber may constitute part of means for controlling the rate at which energy is imparted to each unit mass of dough passing through the modifying chamber.

The means for controlling the speed of rotation of the kneading elements may constitute part of means for controlling the amount of energy imparted to each unit mass of dough in the modifying chamber.

There may be provided means for measuring the amount of energy imparted to the dough, for example a wattmeter connected to an electric motor driving the kneading elements.

The purpose of the means for controlling the speed of rotation of the kneading elements is to provide for control of the amount of energy per unit mass imparted to the dough. In addition to the factor of the rate of working of the machine, the energy imparted per unit mass is affected by the rate of flow of dough through the apparatus, known as the throughput. The amount of energy imparted per unit mass may also be varied for a constant throughput by varying the number of kneading elements in the modifying chamber.

The means for controlling the quantity of dough in the modifying chamber at any one time may comprise a restriction valve which restricts the flow of dough from the modifying chamber. The restriction valve may be adjustable. The purpose of these controlling means is to control the rate at which energy is imparted to the dough by controlling the length of time for which any part of it remains in the modifying chamber.

There may be provided in the modifying chamber a pressure gauge for indirectly measuring the quantity of dough in the modifying chamber, and this gauge may be so coupled to the restriction valve that the aperture thereof is automatically adjusted to maintain a predetermined quantity of dough in the modifying chamber. The pressure in the chamber is related to the quantity of dough therein.

The quantity of dough in the modifying chamber may also be controlled by changing the effective volume of the modifying chamber.

Although the invention has been discussed primarily in terms of dough, it will be understood that the invention is not limited to the modification of dough but is applicable to the processing of other like materials the properties of which can be varied by expending predetermined amounts of energy per unit mass in modifying the material at a predetermined rate.

A preferred embodiment of the invention consists of a mixing and modifying machine for use in the continuous production of dough, the machine including a feeding chamber, enclosing a feeding screw which passes the material from which the dough is to be made to a mixing chamber in which the material is mixed by means of rotors and stators, and the said modifying chamber in which the dough is modified by rotors and stators.

Each of the rotors in the mixing chamber may comprise a plurality of blades so orientated relative to each other that when the rotor is rotated in a fluid no resultant axial thrust is exerted on the fluid, but mixing action is set up in a plane perpendicular to the axis of rotation of the rotor.

Preferably the feeding screw and rotors are arranged to run at a suitable speed to be self-cleaning.

Embodiments of the invention will now be described by way of example with reference to the accompanying drawings in which:

FIG. 1 is a longitudinal cross-section of a mixing and modifying machine for dough embodying the invention, FIG. 2 is a transverse cross-section of the outer casing of the machine along the line II—II in FIG. 1, FIG. 3 is a longitudinal cross-section of an alternative construction of an outlet chamber of the machine shown in FIG. 1, FIG. 4 is a perspective view on an enlarged scale of one of the rotors of the machine and FIG. 5 is a schematic diagram illustrating the general arrangement of the machine shown in FIG. 1 in relation to apparatus and control means associated therewith.

The mixing and modifying machine shown is for use in the continuous production of dough. The machine 10 consists of three main sections, a feeding chamber 11, a mixing chamber 12 and a modifying chamber 13. The cylindrical feeding chamber 11 is defined by a casing 14 having an inlet port 15 in the upper part thereof. An Archimedean screw 16 is located coaxially within the feeding chamber 11 and is keyed to a main shaft 18 which extends through all three main sections of the machine 10. At the end of the feeding chamber 11 remote from the other sections of the machine 10, the main shaft 18 is coupled to a reduction gear box 17 driven by an electric motor 60 (FIG. 5) via a variable speed gear 59 and a belt drive 65. By adjusting the variable speed gear 59, the rate of rotation of the main shaft 18 can be varied between 63 r.p.m. and 382 r.p.m.

The main shaft 18 is overhung, being supported at one end only, by suitable bearings, of which only one, 37, is shown in the drawings. It is an advantage of this construction that all the bearings in which the shaft runs are outside the sections of the machine through which the dough flows.

The mixing chamber 12 is of circular cross-section and is defined by a casing 19 which is detachably fastened to the feeding-chamber casing 14. The casing is formed in two parts 25 and 26 which are connected together detachably to facilitate cleaning and adjustment. Extending radially inwards from the casing 19 are a number of stators consisting of pegs 20, interleaved with rotors 21 which are keyed to the main shaft 18. Each rotor 21 consists of two pairs of blades 22 and 23 which are so angled that when the rotor is rotated in a fluid there is no resultant axial thrust. The construction and action of the rotors 21 will be described in more detail hereinafter. The casing 19 includes water jackets 24 whereby the temperature in the mixing chamber 12 may be controlled. One purpose of the mixing chamber is to smooth out variations in the rate of flow of flour through the inlet port as this may not be absolutely constant over short periods of time.

The modifying chamber 13 is defined by a casing 27 of similar construction to that of the mixing chamber, in that it consists of two parts 28 and 29 detachably connected to each other, it has water jackets 30, and a number of stators consisting of pegs 31. Keyed to the main shaft 18 are a number of rotors 32 each consisting of a series of pins 33 radially disposed and interleaving the pegs 31.

The water jackets 24, 30 are connected by ducts 61 to a manifold 62 which in turn is connected by a supply duct 63 to a cooling water heat-exchanger 67 and by ducts 64 to a manifold 65 which in turn is connected by a return duct 66 to the said heat-exchanger 67.

In the embodiment shown the main shaft 18 is of such a length that four rotors 32 and four rotors 21 can be keyed to it. Correspondingly, the modifying chamber casing 27 consists of two independent parts 28 and 29, and the mixing chamber casing 19 of two parts 25 and 26. Other embodiments may have more rotors and correspondingly more casing parts. The constructions of the casing parts and rotors are such that they may easily be detached and replaced by spacing elements if required. The rotors 32 and 21 are secured by sliding them on the main shaft 18 and locking them in place by screwing on the impeller 36, which acts as a locking device. One or more of the rotors may be replaced by a non-working spacing element which does not include rotor pins. The purpose of such spacing elements is to reduce the work done by the rotors on the dough as will be explained hereinafter.

The casing parts 28, 29, 25 and 26 are secured by longitudinal bolts 39 (shown in FIG. 2) passing through the water jackets 30 and 24 and screwing into the end of the feeding chamber casing 14. One or more of the casing parts can be removed from the bolts and replaced by spacing elements if required.

In addition to enabling the number of working elements to be varied, the construction of the rotors and casing parts allows all the parts of the machine which come into contact with dough to be dismantled easily to facilitate cleaning.

At the end of the modifying chamber 13 is an outlet chamber 34 leading to an adjustable restriction valve 35. Between the outlet chamber 34 and the modifying chamber 13, and keyed to the end of the main shaft 18 remote from the reduction gear 17 is an impeller 36.

When the mixing and modifying machine is in operation, flour is fed at a controlled rate through the inlet port 15. The flour falls onto the Archimedean screw 16 which is rotated in a sense such that it acts as a feed screw and conveys the flour to the mixing chamber 12. While the flour is being conveyed, the liquid is injected at a controlled rate into the feeding chamber 11 from injection points 38 located on the upper half of the chamber 11 after the inlet port 15. The flour is supplied to the inlet port 15 as shown in FIG. 1 from a flour-feeding device of known type which comprises a flour hopper 51, a flour agitator 52 and a constant-weight feeding apparatus 53. The apparatus 53 includes a flour vibrator 54 and a conveyor 55 supported on the end of one arm of a weigh-beam 56. The rate at which flour is supplied by the conveyor 55 to the inlet port 15 of the mixing and modifying machine can be controlled by adjusting the position of a weight 57 along the outer arm of the weigh-beam 56. Control means indicated by a broken line 58 are arranged to increase the amplitude of vibration of the flour vibrator 54 when the weight-beam arm carrying the weight 57 rocks downward and to reduce this amplitude of vibration when the said arm rocks upward.

The liquid ingredients are supplied from liquid tanks 76, the outlet pipes 77 of which are connected via a pipe junction 78 to the input of a pump 79. The pump 79 delivers the liquid ingredients, through a filter 81 and a flowmeter 82, to a regulating valve 74 and thence by a pipe 75 to one of the injection points 38.

High melting-point fat, e.g. fat having a melting point in the region of 110° F., is delivered from a heated, temperature-controlled tank 91 by a variable speed fat metering pump 92 via a pipe 93 to a second one of the injection points 38.

The rate at which the ingredients are conveyed to the mixing chamber is determined by the rates at which flour, liquid and fat are introduced through the inlet port 15 and the injection points 38. The feeding chamber is normally only partly filled with dough ingredients and consequently any change in the speed at which the Achimedean screw 16 is driven will only temporarily effect the rate of introduction of dough ingredients into the mixing chamber 12.

In the mixing chamber 12 the rotors 21 mix the dough in conjunction with the stator pegs 20. The blades 22 of the rotors are so orientated as to set up mixing action in a plane perpendicular to the axis of the main shaft 18 and hence perpendicular to the direction of the flow caused by the screw 16 and the impeller 36. Each rotor may consist of a four-bladed impeller with the normal inclination of two of the blades reversed so that oppositely situated blades urge the dough axially in opposite directions. In the modifying chamber 13 the rheological properties of the dough are changed by the beating and kneading action of the stator pegs 31 and the rotor pins 33.

It is convenient at this stage of the description of the apparatus to refer to FIG. 4 of the drawings, in which there is shown an enlarged isometric view of one of the rotors 21.

Although the action of the rotors 21 in the mixing chamber 12 (FIG. 1) is predominantly a mixing action, the shape of the rotors 21 is such that, after the dough has been mixed, the rotors 21 carry out a beating and kneading action, and begin to develop the dough. With some types of dough it is preferable to arrange that further rotors 21 replace the rotors 32 in the modifying chamber 13, so that the rotors 21 extend from the feed screw 16 to the impeller 36. In such a case the rotors used in both chambers are of the same type and there is no strict division of the mixing and modifying actions into different chambers of the apparatus. The action of the rotors is, however, predominantly a mixing action in the section of the apparatus named as the mixing chamber, and is predominantly a modifying action in the section named as the modifying chamber.

It has previously been proposed to knead or develop the dough in continuous dough-making machines by a stretch and relax action. This action was achieved in one type of machine, known as the Buss-Ko-Kneader, by passing the dough through a chamber in which a shaft carrying pins interleaved with stators was rotated and, at the same time, moved to and fro in a reciprocating motion along the axis of rotation. A similar stretch and relax action is achieved with the rotor shown in FIG. 4 by simple rotation without the need for reciprocating motion of the shaft along the axis of rotation.

When the rotor 21 is being rotated, for example on the shaft 18 in the modifying chamber 13 of FIG. 1, dough is urged first in one direction by one pair of adjacent blades having lead angles of the same sense and then in the opposite direction by the other pair of adjacent blades. Thus the orientation of the blades is such that the direction of flow of the dough tends to be reversed once per revolution of the rotor. For example, with the shaft 18 rotating at 300 r.p.m. the direction of flow of the dough is reversed 5 times per second. With a typical throughput of dough, the dough would be subjected to 25 reversals whilst passing one rotor. It will be appreciated that the overall direction of flow of the dough is determined by the feed screw 16 and the impeller 36. The action of the rotors 21 produces only local movement of the dough.

It will also be appreciated that there are many other arrangements of blades which can be used to obtain the required action, the only requirement being that at least two blades are inclined to the axis of the rotor in opposing senses. For example, four blades may be so arranged on a rotor that each pair of oppositely situated blades urge the dough in the same axial direction, whilst any pair of adjacent blades urge the dough in opposite axial directions. In such a case the direction of flow tends to be reversed twice per revolution of the shaft. In a further example the blades of a rotor may be so arranged that the axial thrust exerted by one set of blades is not entirely cancelled by the axial thrust of the other set of blades which are inclined in the opposing sense to the first set. In such a case the small resulting axial thrust may be arranged to be in a direction such as to assist the general flow of dough brought about by the feed-screw 16 and the impeller 36.

After the dough leaves the modifying chamber, it has been formed into a slurry suitable for the retention of gas which may be formed by conventional methods incorporating the use of yeast already contained in the slurry, or gas may be injected into the dough under a high pressure of, for example, 200 lbs. per sq. in. above atmospheric. The dough leaving the modifying chamber passes through the outlet chamber 34 and the restriction valve 35, to further apparatus in which the aerating or fermenting process is carried out.

An alternative construction of the outlet chamber 34 is shown in FIG. 3. The chamber 34' is frusto-conical in shape and coaxial with the main shaft 18. A coaxial outlet chamber such as is shown in FIG. 3 gives improved extrusion of the slurry as compared with the outlet chamber 34 shown in FIG. 1. On the other hand, the outlet chamber 34 shown in FIG. 1 is easier to drain during cleaning of the apparatus. A drain hole 40 is provided in the outlet chamber 34' of FIG. 3 to allow the chamber to drain after cleaning.

Also shown in the modified outlet chamber 34' is a thermometer 41' for measuring the temperature of the slurry finally obtained in the outlet chamber 34. There is an optimum final temperature for the extruded slurry, which, in one example, is approximately 86° F. When energy is imparted to the dough in the various chambers of the apparatus, for example a total quantity of energy of 0.4 H.P. min. per lb. wt., a rise in the temperature of the dough of approximately 26° F. occurs. As the temperature of the raw materials can vary considerably, for example the flour from 65 to 80° F. and the liquor from 55 to 65° F., it is necessary to regulate the temperature of the dough as it passes through the various chambers of the apparatus. This regulation can be achieved by varying the temperature and/or the rate of flow of the fluid passing through the jackets 30 and 24. In FIG. 5, a broken line 71 between the thermometer 41 and the heat-exchanger 67 indicates control means arranged to alter the cooling rate of the heat-exchanger 67 in reverse relation to temperature changes measured by the thermometer 41. The thermometer 41 may be of a kind in which a bimetallic strip is caused by changes of temperature to rotate a spindle. This spindle may be mechanically or electrically coupled to the spindle of a regulating valve in the heat-exchanger 67 which controls the rate of circulation of liquid through the heat-exchanger coil and hence also through the jackets 24 and 30 connected therewith. The direction of circulation of liquid between the jackets 24 and 30 and the coil within the heat-exchanger 67 is indicated by the arrowheads in FIG. 5. Cooling water from an outside source; e.g., water mains are passed through the space surrounding the heat-exchanger coil in the opposite direction to that of the flow of liquid through the latter.

In a preferred embodiment of the invention there is provided a wattmeter 68 connected to the motor 60 by means of a cable 80 and operatively connected to variable speed gear 59 by automatic means for varying the speed of rotation of the main shaft 18 to regulate the amount of energy imparted to each unit mass of dough in the modifying chamber 13. The coupling between the wattmeter 68 and the variable speed gear 59 is indicated by a broken line 72 in FIG. 5. A suitable arrangement for this purpose is to connect the spindle of the wattmeter 68 to a potentiometer and use a suitable servomechanism arranged to respond to the potential picked-off the potentiometer to operate the control member of the variable speed gear 59. The wattmeter 68 is also operatively connected, by means indicated by a chain-dotted line 73, to the liquid supply control valve 74 (FIG. 5) which controls the rate of supply of liquid ingredients from the tanks 76 to one of the injection points 38.

As an alternative to the use of a wattmeter for indicating and controlling the amount of energy imparted, there may be employed a torque meter between the reduction gear 17 and the main shaft 18, working in conjunction with a tachometer measuring the speed of rotation of the shaft. A preferred embodiment of this alternative connection is shown in FIG. 5. A torque meter 86 of the strain gauge type is connected between the output of the reduction gearbox 17 and the shaft 18. A tachometer 87 is connected to the shaft 18. Operative connections between the torque meter 86 and the tachometer 87 on the one hand and the variable speed gear 59 on the other hand are indicated respectively by broken lines in FIG. 5. In this case, any suitable mechanisms are arranged to respond to the electrical output signals from the torque meter 86 and the tachometer 87 to operate the control member of the variable speed gear 59, so that the shaft 18 is driven at a speed which varies inversely to the power consumption represented by the product of the measurements made by the torque meter 86 and the tachometer 87. Thus the torque and speed of rotation of the main shaft are measured, the product giving the power consumed.

There are a number of factors connected with the amount of energy imparted to each pound of dough passing through the machine and the rate at which the energy is imparted. These can be varied, some dependently and some independently, to ensure that the optimum amount of energy is imparted at the optimum rate.

One example will now be given of a set of optimum conditions for a particular throughput:

Quantity of flour used: 2 sacks per hour.
Throughput of dough:
    880 lbs. wt. per hour.
    14.6 lbs. wt. per min.
Optimum energy to be imparted to dough: 0.4 H.P. min. per lb. wt.
Optimum rate of working at given throughput:
    $0.4 \times 14.6$ H.P.
    5.84 H.P.
Optimum rate of imparting energy: 0.23 H.P. min. per lb. wt. per min.
Optimum rate of power input for the given throughput:
    $0.23 \times 14.6$ H.P. per min.
    3.36 H.P. per min.
Time each lb. wt. of dough spends in modifying chamber:
    5.84/3.36 min.
    $\approx 1.7$ min.

The consistency of the dough may vary. For example, if the dough becomes slightly thinner, there will be a tendency for the amount of energy imparted per pound of dough to become less. When this happens the wattmeter registers a reduction of power consumed, and the rate of rotation of the shaft 18 is increased until the energy imparted to the dough is restored to the optimum level. The wattmeter 68 may be coupled by means indicated diagrammatically by the line 72 in FIG. 5 to the variable speed gear 59 driving the kneading elements in such a manner that the speed of rotation of the elements is automatically regulated to maintain at a substantially constant value the amount of energy imparted to the dough.

There may be provided in the modifying chamber 13 a pressure gauge 83 which is adapted to indicate indirectly the level of dough in the chamber. The gauge may be so coupled by means indicated diagrammatically by the line 84 in FIG. 5 to the restriction valve 35 that the level of dough is automatically maintained at the predetermined value. The coupling means between the gauge and the restriction valve may take the form of a potentiometer connected to the gauge, with a servo-mechanism arranged to respond to the potential picked-off the potentiometer to operate the valve 35.

In addition to the various automatic controls such as those which may be operated by the wattmeter 68, the thermometer 41 and the pressure gauge 83, auxiliary manual controls (not shown) are provided for presetting and adjusting the ratio of the variable speed gear 59, the cooling rate of the heat-exchanger 67 and the aperture of the restriction valve 35. Before starting the motor 60, the operator checks the settings of such manual controls, including the position of the weight 57 on the weighbeam 56, and also makes sure that the heat-exchanger 67 is adjusted to provide the correct cooling rate. After starting the motor 60, and running the variable speed gear 59 up to the required speed, he starts the constant-weight flour feeder 53, the liquid ingredients supply pump 79 and the fat metering pump 92 so that the flour and liquid ingredients reach the mixing chamber 11 simultaneously. If, after the machine has started, the wattmeter 68 does not show the correct reading, he then appropriately adjusts the variable speed gear 59 accordingly. While the machine is running, dough will be progressively mixed, mechanically developed and discharged as developed dough through the outlet of the modifying chamber 13. If the various controls have been suitably adjusted, the machine will normally operate continuously within the required limits in regard to the amount of energy imparted per pound of dough and the rate at which this energy is imparted, since the automatic control means will prevent undue variations in the said amount and rate.

The throughput of the machine is adjustable by correspondingly altering the rate at which the dough ingredients are fed into the machine through the inlet port 15 and the injection points 38, but any such adjustment will affect both the amount of energy imparted to each unit mass of dough during its passage through the machine and the rate at which this energy is imparted. If, therefore, it is deemed to maintain the amount and rate of energy input constant, additional adjustments will be necessary. Thus, if, for example, the throughput is to be doubled, not only is it necessary to double the rate at which the dough ingredients are fed into the machine, but two additional adjustments must be effected. Firstly, the energy expended by the drive unit 17 must be doubled. This can be achieved by increasing the speed of rotation of the main shaft 18 or by increasing the number of rotors and stators in the modifying chamber 13. Secondly, the aperture of the restriction valve 35 must be adjusted to increase the level of dough in the modifying chamber 13. The quantity of dough in the modifying chamber must be changed to maintain the time which each pound of dough spends in the chamber at an optimum value. In order to duoble the quantity of dough in the modifying chamber it may be necessary to alter the volume of the chamber, for example by removing the rotors 32 and replacing them with rotors having hubs of smaller diameter, or by adding additional sections to the chamber.

Preferably the apparatus is arranged so that the feeding screw and rotors can run at a suitable speed to be self-cleaning as well as at a speed suitable for the mixer-modifier to impart energy under the optimum conditions.

Whilst, for convenience, the mixing and modifying machine has been described as consisting of three functional zones, it will be understood that these functions are not entirely limited to the specified zones. In particular, as has already been stated, the action of the rotors in the mixing chamber, although being primarily a mixing action, may also constitute an action of modifying the dough.

What is claimed is:

1. Apparatus for the continuous production of bread dough comprising
   an interconnected series of chambers including
      a feeding chamber having inlet means for dough ingredients,
      a mixing chamber and
      a modifying chamber having an outlet for developing dough,
   a rotary shaft extending through said series of chambers,
   a feed screw mounted on said shaft and located in said feeding chamber,
   mixing blades mounted on said rotary shaft at successive positions along the same and located within said mixing chamber, and
   kneading elements mounted on said rotary shaft at successive positions along the same and located within said modifying chamber.

2. Apparatus according to claim 1, wherein said kneading elements are constituted by radially projecting pins.

3. Apparatus according to claim 1, wherein said kneading elements are constituted by radially projecting kneading blades.

4. Apparatus according to claim 1, wherein the mixing and modifying chambers have stator elements located at intervals along their lengths and projecting inwardly towards said rotary shaft in positions between the successive mixing blades and between the successive kneading elements.

5. Apparatus according to claim 1 wherein mixing blades are mounted in opposed pairs on hubs keyed on the rotary shaft.

6. Apparatus according to claim 5 wherein the two blades of each opposed pair of mixing blades are inclined to the axis of the rotary shaft in opposing senses.

7. Apparatus according to claim 1 wherein the kneading elements consist of blades mounted in opposed pairs on hubs keyed to the rotary shaft.

8. Apparatus according to claim 7 wherein the two blades of each opposed pair of kneading blades are inclined to the axis of the rotary shaft in opposing senses.

9. Apparatus according to claim 1, wherein the mixing and modifying chambers comprise a plurality of casing parts detachably secured together in coaxial end-to-end relationship.

10. Apparatus according to claim 9, wherein each of said casing parts incorporates a water jacket.

11. Apparatus according to claim 1 wherein shaft bearings, located externally of the feeding chamber at the end thereof remote from the mixing and modifying chambers, are arranged to support one end of the rotary shaft, the other end of said rotary shaft being unsupported.

12. Apparatus according to claim 1, and also comprising means for varying the size of said dough outlet; measuring means for measuring the amount of dough contained within said modifier chamber, and means operatively connecting said measuring means with said means for varying said dough outlet size whereby the amount of dough contained within said modifier chamber is maintained at substantially constant predetermined value.

13. Apparatus according to claim 12 wherein said measuring means includes a pressure gauge operatively connected to the interior of said modifier chamber for measuring the pressure therein.

14. Apparatus for the continuous production of dough comprising an interconnected series of chambers including
   a feeding chamber having inlet means for dough ingredients,
   a mixing chamber and
   a developing chamber having an outlet for developed dough,
   means for introducing dough ingredients at a controlled rate into said feeding chamber through the inlet means thereof,
   a rotary shaft extending through said series of chambers,
   a feed screw mounted on said shaft and located in said feeding chamber,
   mixing rotors provided with outwardly projecting mixing elements, and mounted on said rotary shaft at successive positions along the same within said mixing chamber,
   kneading rotors provided with outwardly projecting kneading elements and mounted on said rotary shaft at successive positions along the same within said developing chamber, and
   stator elements projecting into said mixing and developing chambers in positions between the mixing elements of adjoining mixing rotors and between the kneading elements of adjoining kneading rotors respectively.

15. Apparatus according to claim 14 wherein at least one of said dough-kneading elements comprises a rotor having at least two blades projecting from the periphery thereof, said two blades being inclined to the axis of said rotor in opposing senses, whereby on rotation of said dough-kneading element axial thrusts are exerted on said dough by said opposing blades in opposing directions respectively.

16. Apparatus according to claim 14 wherein at least one of said dough-kneading elements comprises a rotor having at least four blades projecting from the periphery thereof and arranged in the form of two pairs of oppositely situated blades, the blades of each pair of oppositely situated blades being inclined to the axis of the said rotor in opposing senses respectively.

17. Apparatus according to claim 14 wherein at least one of said dough-kneading elements comprises a rotor having at least four blades projecting from the periphery thereof, the blades of each pair of adjacent blades being inclined to the axis of the said rotor in opposing senses respectively.

18. Apparatus according to claim 14 wherein at least one of said dough-kneading elements comprises a rotor having at least two blades projecting from the periphery thereof, said two blades being inclined to the axis of said rotor in opposing senses, whereby on rotation of said dough-kneading element the resultant axial thrust exerted on said dough by said dough-kneading element is substantially zero.

19. Apparatus for use in the continuous production of dough comprising a modifier chamber having an inlet and an outlet for dough; means for varying the size of said dough outlet; a pressure gauge operatively connected to the interior of said modifier chamber for measuring the pressure therein; at least one rotatable dough-kneading element mounted within said modifier chamber; drive means for rotating said dough-kneading element; means for advancing dough through said modifier chamber; first control means for controlling the amount of energy imparted to each unit mass of dough during its advance through said modifier chamber, and second control means for controlling the rate at which energy is imparted to each unit mass of dough in said modifier chamber, said second control means including means operatively connecting said pressure gauge with said means for varying said outlet size whereby the amount of dough contained within said modifier chamber is maintained at a predetermined substantially constant value.

20. Apparatus according to claim 19 wherein said first control means includes means for controlling the speed of rotation of said dough-kneading element.

21. Apparatus for use in the continuous production of dough comprising a modifier chamber having an inlet and an outlet for dough; means for varying the size of said outlet; a pressure gauge associated with said modifier chamber for measuring the pressure therein; at least one rotatable dough-kneading element, said dough-kneading element being rotatably mounted within said modifier chamber; drive means for rotating said dough-kneading element; means for advancing dough through said modifier chamber; first control means for controlling the speed of rotation of said dough-kneading element, and dough-kneading element comprising a rotor having at least two blades extending from the periphery thereof, said two blades being inclined to the axis of said rotor in opposing senses, whereby on rotation of said dough-kneading element axial thrusts are exerted on said dough by said opposing blades in opposing directions respectively; and second control means for controlling the length of time during which each unit mass of dough remains in said chamber during its advance through said modifier chamber, said first control means including means operatively connecting said pressure gauge with said means for varying said outlet size whereby the amount of dough contained within said modifier chamber is maintained at a predetermined substantially constant value.

22. Apparatus according to claim 19 including means for varying the effective volume of said modifier chamber.

23. Apparatus according to claim 19 including an electric motor constituting said drive means for rotating said rotatable dough-kneading element; a wattmeter; and means operatively connecting said wattmeter to said motor.

24. Apparatus according to claim 19 including an electric motor constituting said drive means for rotating said rotatable dough-kneading element; a tachometer; means operatively connecting said tachometer to said motor; a torque meter; and means operatively connecting said torque meter to said motor.

25. Apparatus for the continuous production of bread dough comprising
an interconnected series of chambers including
a feeding chamber having inlet means for dough ingredients,
a mixing chamber and
a modifying chamber having an outlet for developing dough,
a rotary shaft extending through said series of chambers,
a feed screw mounted on said shaft and located in said feeding chamber,
mixing blades mounted on said rotary shaft at successive positions along the same and located within said mixing chamber,
kneading elements mounted on said rotary shaft at successive positions along the same and located within said modifying chamber,
means for supplying solid dough ingredients to the inlet means of the feeding chamber,
means including a regulating valve for supplying liquid dough ingredients to said inlet means,
a wattmeter,
means operatively connecting said wattmeter to said rotary shaft, and
means for operatively connecting said wattmeter to said regulating valve so as to vary the rate of supply of liquid dough ingredients to the mixing chamber in dependence upon the energy measured by said wattmeter.

References Cited

UNITED STATES PATENTS

| | | | |
|---|---|---|---|
| 2,868,143 | 1/1959 | Strahmann | 107—30 |
| 3,030,898 | 4/1962 | Freed | 107—40 |
| 3,332,369 | 7/1967 | Freed | 107—40 |
| 2,931,320 | 4/1960 | Bandel. | |
| 2,953,460 | 9/1960 | Baker | 107—30 X |

ROBERT W. MICHELL, Primary Examiner

JOSEPH SHEA, Assistant Examiner

U.S. Cl. X.R.

259—10